US011379075B1

(12) United States Patent
Lee et al.

(10) Patent No.: US 11,379,075 B1
(45) Date of Patent: Jul. 5, 2022

(54) ELECTRONIC DEVICE AND TOUCH DETECTION METHOD

(71) Applicant: TPK Advanced Solutions Inc., Fujian (CN)

(72) Inventors: Lien Hsin Lee, Taipei (TW); Yu Ting Chan, Taoyuan (TW); Tai Shih Cheng, Taipei (TW)

(73) Assignee: TPK Advanced Soulutions Inc., Xiamen (CN)

( * ) Notice: Subject to any disclaimer, the term of this patent is extended or adjusted under 35 U.S.C. 154(b) by 0 days.

(21) Appl. No.: 17/215,399

(22) Filed: Mar. 29, 2021

(51) Int. Cl.
*G06F 3/041* (2006.01)
*G06F 3/044* (2006.01)

(52) U.S. Cl.
CPC ........ *G06F 3/04166* (2019.05); *G06F 3/0445* (2019.05); *G06F 2203/04105* (2013.01); *G06F 2203/04106* (2013.01); *G06F 2203/04107* (2013.01)

(58) Field of Classification Search
CPC ............... G06F 3/04166; G06F 3/0445; G06F 2203/04105; G06F 2203/04106; G06F 2203/04107
See application file for complete search history.

(56) References Cited

U.S. PATENT DOCUMENTS

2017/0255293 A1* 9/2017 Sundara-Rajan ... G06F 3/04186
2017/0351423 A1* 12/2017 Yokoyama .......... G06F 3/04883
2020/0379632 A1 12/2020 Edwards et al.

FOREIGN PATENT DOCUMENTS

| CN | 104765528 A | 7/2015 |
| CN | 106557212 A | 4/2017 |
| TW | 201349046 A | 12/2013 |

* cited by examiner

*Primary Examiner* — Afroza Chowdhury
(74) *Attorney, Agent, or Firm* — Cooper Legal Group, LLC

(57) ABSTRACT

An electronic device includes a touch module, a display module, and a control module. The touch module is configured to detect a touch input. The display module is disposed under the touch module. The control module is electrically connected to the touch module and the display module and configured to: detect a contact area of the touch input on the touch module; make the display module display a first input interface when the contact area is greater than a first threshold area; and make the display module display a second input interface when the contact area is smaller than a second threshold area, in which the second threshold area is equal to or smaller than the first threshold area.

16 Claims, 5 Drawing Sheets

ELECTRONIC DEVICE AND TOUCH DETECTION METHOD

BACKGROUND

Technical Field

The present disclosure relates to an electronic device and a touch detection method.

Description of Related Art

As the demand for touch pressure sensing applications has greatly increased, related integrated applications have emerged accordingly. In response to mobile needs, products equipped with applications with touch sensing, pressure sensing, and display functions have attracted attention.

Some existing art (for example, Chinese Patent Application Publication No. CN106557212A) uses a pressure-sensitive composite structure with conductive particles sandwiched between two electrodes, and uses impedance to perform pressure interpretation. However, the light transmittance of this conventional structure needs to be improved, so the conventional structure is not yet able to achieve multiple integrated applications (for example, requirements of being equipped with a stylus, being touched by fingers, being foldable, having high light transmittance, and being thin).

Accordingly, how to provide an electronic device and a touch detection method to solve the aforementioned problems has become an important issue to be solved by those in the industry.

SUMMARY

An aspect of the disclosure is to provide an electronic device and a touch detection method that can efficiently solve the aforementioned problems.

According to an embodiment of the disclosure, an electronic device includes a touch module, a display module, and a control module. The touch module is configured to detect a touch input. The display module is disposed under the touch module. The control module is electrically connected to the touch module and the display module and configured to: detect a contact area of the touch input on the touch module; make the display module display a first input interface when the contact area is greater than a first threshold area; and make the display module display a second input interface when the contact area is smaller than a second threshold area, in which the second threshold area is equal to or smaller than the first threshold area.

In an embodiment of the disclosure, a ratio of the first threshold area to the second threshold area is equal to or greater than 20.

In an embodiment of the disclosure, the control module is further configured to: detect the touch input through the touch module at a first report rate when the contact area is greater than the first threshold area; and detect the touch input through the touch module at a second report rate when the contact area is smaller than the second threshold area, in which the second report rate is greater than the first report rate.

In an embodiment of the disclosure, the first report rate ranges from about 60 Hz to about 100 Hz.

In an embodiment of the disclosure, the second report rate is equal to or greater than 200 Hz.

In an embodiment of the disclosure, the electronic device further includes a pressure-sensing module. The pressure-sensing module is disposed under the touch module and configured to detect applied force of the touch input through the touch module.

In an embodiment of the disclosure, the electronic device further includes a first body and a second body. The touch module and the display module are disposed in the first body. The second body is rotatably connected to the first body.

In an embodiment of the disclosure, the touch module is a One Glass Solution (OGS) type touch module or a Glass-Film-Film (GFF) type touch module.

According to an embodiment of the disclosure, a touch detection method is applied to an electronic device including a touch module and a display module. The method includes: detecting a contact area of a touch input on the touch module; making the display module display a first input interface when the contact area is greater than a first threshold area; and making the display module display a second input interface when the contact area is smaller than a second threshold area, in which the second threshold area is equal to or smaller than the first threshold area.

In an embodiment of the disclosure, the method further includes: detecting the touch input through the touch module at a first report rate when the contact area is greater than the first threshold area; and detecting the touch input through the touch module at a second report rate when the contact area is smaller than the second threshold area, in which the second report rate is greater than the first report rate.

In an embodiment of the disclosure, the electronic device further includes a pressure-sensing module disposed under the touch module. The method further includes: detecting applied force of the touch input on the touch module; activating a virtual key force sensing mode to detect the touch input through the pressure-sensing module when the contact area is greater than the first threshold area and the applied force is greater than a first threshold force; and detecting the touch input through the touch module when the contact area is smaller than the second threshold area.

In an embodiment of the disclosure, the method further includes: not activating the virtual key force sensing mode to detect the touch input through the touch module when the contact area is greater than the first threshold area and the applied force is smaller than a second threshold force.

Accordingly, in the electronic device of the present disclosure, the control module is configured to make the display module display different input interfaces respectively when the contact area of the touch input relative to the touch module is greater than the first threshold area and smaller than the second threshold area, so it can effectively achieve multiple integrated applications (for example, the control module can automatically provide corresponding input interfaces in response to the source of the touch input being a finger or a stylus). In addition, the control module is configured to detect the touch input at different report rates respectively when the contact area of the touch input relative to the touch module is greater than the first threshold area and smaller than the second threshold area, so the control module can effectively improve the detection accuracy of the electronic device when the contact area of the touch input is small. Furthermore, in the finger mode, it is possible to determine whether to activate the virtual key force sensing mode or not to activate the virtual key force sensing mode according to the magnitude of the pressing force and maintain the touch mode.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
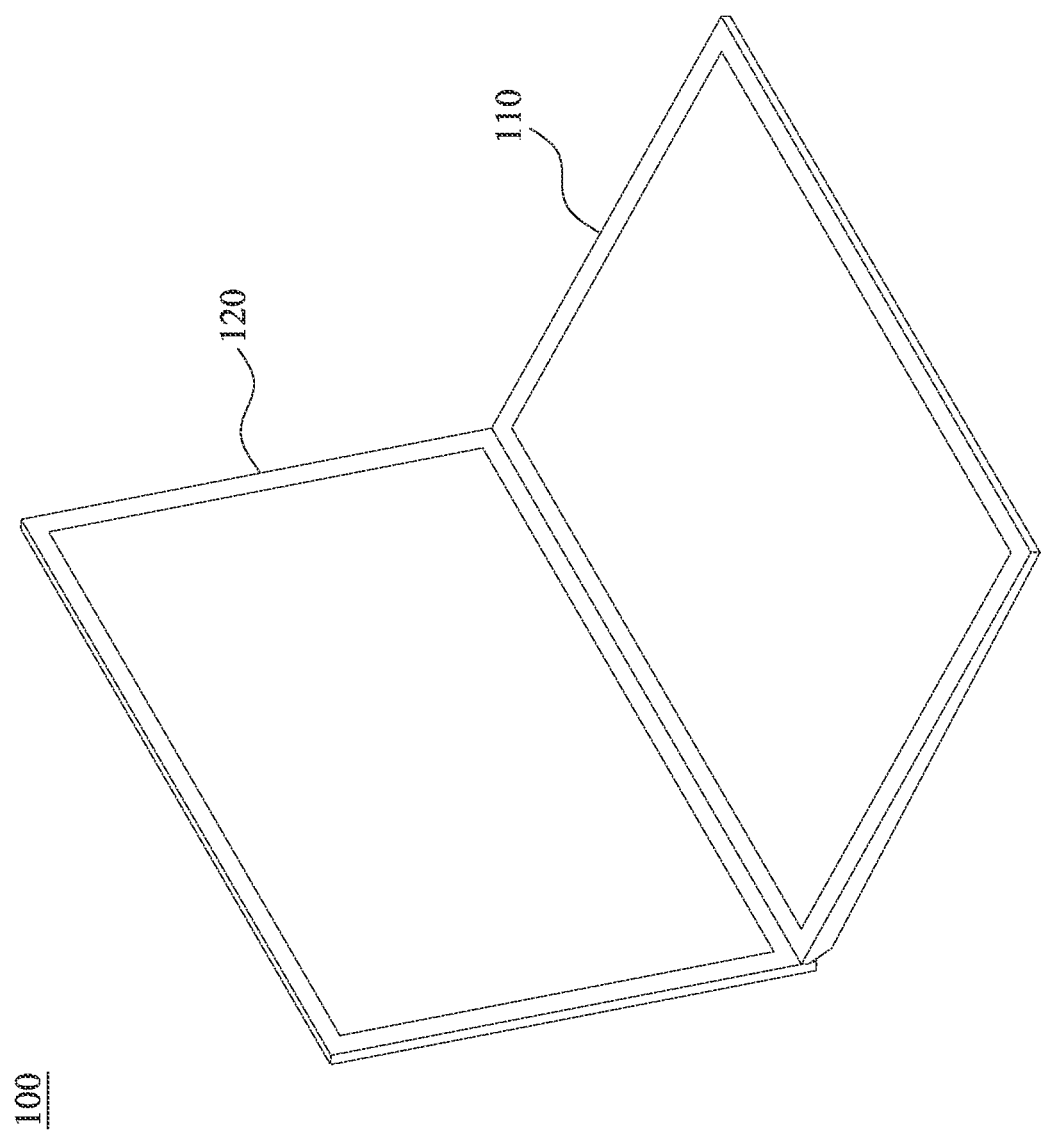
FIG. 1A is a schematic diagram showing an electronic device according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1A. FIG. 1A is a schematic diagram showing an electronic device 100 according to an embodiment of the present disclosure. As shown in FIG. 1A, the electronic device 100 includes a first body 110 and a second body 120. The second body 120 is rotatably connected to the first body 110 (for example, through a hinge structure). It can be seen that the electronic device 100 in this embodiment adopts the architecture of a notebook computer, but the disclosure is not limited in this regard.

Figure 1B:
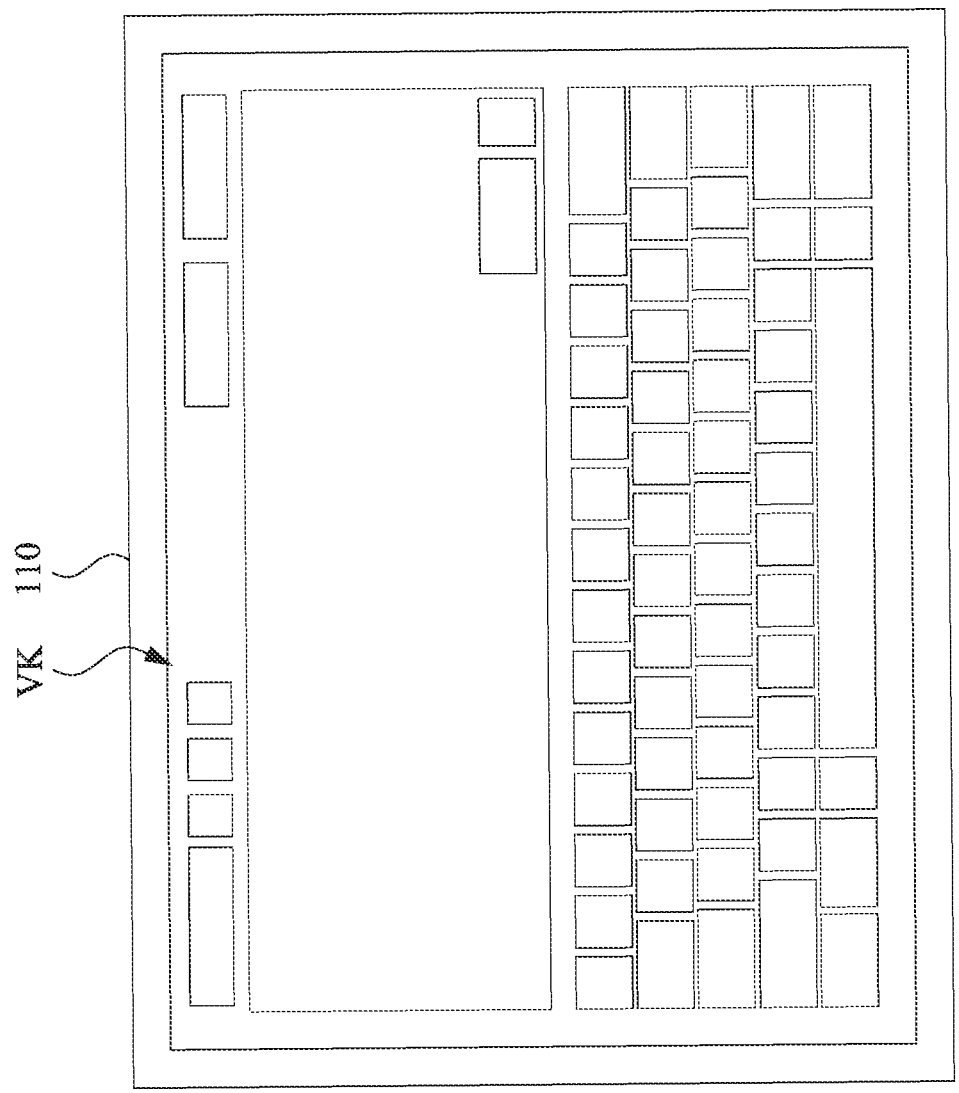
FIG. 1B is a schematic diagram showing a virtual keyboard displayed by a first body according to an embodiment of the present disclosure.
Figure 2:
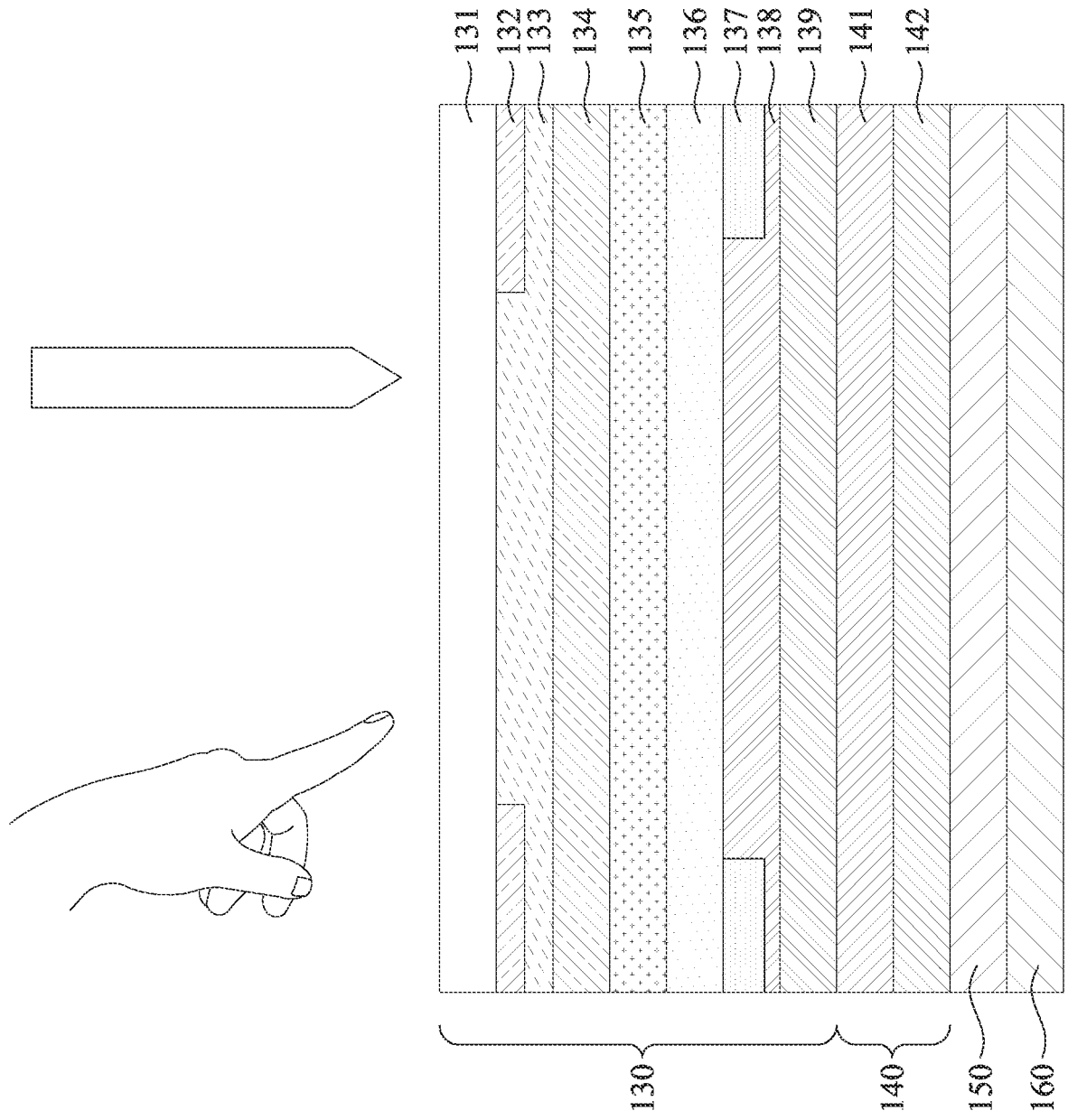
FIG. 2 is a cross-sectional view of some components of the electronic device shown in FIG. 1A according to an embodiment of the present disclosure.

Reference is made to FIGS. 1B and 2. FIG. 1B is a schematic diagram showing a virtual keyboard VK displayed by the first body 110 according to an embodiment of the present disclosure. FIG. 2 is a cross-sectional view of some components of the electronic device 100 shown in FIG. 1A according to an embodiment of the present disclosure. More specifically, FIG. 2 illustrates a cross-sectional view of the first body 110. The electronic device 100 further includes a touch module 130, a pressure-sensing module 140, and a display module 160. The touch module 130 is configured to detect a touch input. The display module 160 is disposed under the touch module 130. The pressure-sensing module 140 is disposed under the touch module 130 and located between the touch module 130 and the display module 160. The pressure-sensing module 140 is configured to detect applied force of the touch input through the touch module 130. An image displayed by the display module 160 can be viewed by a user after sequentially passing through the pressure-sensing module 140 and the touch module 130. The touch module 130, the pressure-sensing module 140, and the display module 160 are disposed in the first body 110.

In some embodiments, the second body 120 is a display. In other words, the electronic device 100 is an electronic product that has both a dual-screen display function and a three-dimensional touch pressure sensing function.

As shown in FIG. 2, the touch module 130 includes a cover plate 131, a shielding layer 132, an optical matching layer 133, a first touch sensing electrode layer 134, a dielectric layer 135, a second touch sensing electrode layer 136, and traces 137. The cover plate 131 defines thereon a touch area and a peripheral area surrounding the touch area (not shown). The shielding layer 132 is disposed in the peripheral area of the cover plate 131. The optical matching layer 133 is disposed under the cover plate 131 and covers the shielding layer 132 to provide a flat lower surface. The first touch sensing electrode layer 134 is disposed under the optical matching layer 133. The second touch sensing electrode layer 136 is disposed under the optical matching layer 133. The dielectric layer 135 covers the first touch sensing electrode layer 134 to electrically insulate the first touch sensing electrode layer 134 and the second touch sensing electrode layer 136. The traces 137 are disposed under the optical matching layer 133 and located in the peripheral area of the cover plate 131. In this way, touch signals (such as mutual capacitance sensing signals) between the first touch sensing electrode layer 134 and the second touch sensing electrode layer 136 can be extracted through the traces 137.

In some embodiments, the first touch sensing electrode layer 134 is separated from the second touch sensing electrode layer 136 by the dielectric layer 135 and forms a bridge-like structure. Therefore, the touch module 130 is an OGS-SITO (One Glass Solution single-sided indium tin oxide (ITO)) type touch module.

However, the disclosure is not limited in this regard. In some other embodiments, the touch module 130 may be a GFF (Glass-Film-Film) type touch module.

In some embodiments, the material of the cover plate 131 includes glass, but the disclosure is not limited in this regard.

In some embodiments, at least one of the first touch sensing electrode layer 134 or the second touch sensing electrode layer 136 may be a silver nanowire electrode layer, a metal mesh, or may include an indium tin oxide (ITO) electrode layer, but the disclosure is not limited in this regard. In order to meet the requirements of optical transmittance and haze, in some embodiments, at least one of the first touch sensing electrode layer 134 or the second touch sensing electrode layer 136 is a silver nanowire electrode layer.

As shown in FIG. 2, the touch module 130 further includes an optical matching layer 138 and a dielectric layer 139. The optical matching layer 138 is disposed under the second touch sensing electrode layer 136 and covers the traces 137 to provide a flat lower surface. The dielectric layer 139 covers the lower surface of the optical matching layer 138.

In some embodiments, as shown in FIG. 2, the pressure-sensing module 140 includes a pressure-sensing coating layer 141 and a light-transmitting electrode layer 142. The pressure-sensing coating layer 141 is coated on a side of the dielectric layer 139 away from the cover plate 131. The light-transmitting electrode layer 142 is coated on a side of the pressure-sensing coating layer 141 away from the touch module 130. A force signal generated by the pressure-sensing coating layer 141 can be extracted through the light-transmitting electrode layer 142.

In some embodiments, the material of the pressure-sensing coating layer 141 includes polyvinylidene difluoride (PVDF). In other words, the pressure-sensing coating layer 141 is a lattice piezoelectric material. When pressure is applied to a certain direction of crystal of this material to produce deformation, a size and direction of a dipole also change accordingly, so an amount of charge also changes, thereby generating a voltage.

In some embodiments, the thickness of the pressure-sensing coating layer 141 ranges from about 7 μm to about 10 μm (preferably about 8 μm).

In some embodiments, the light-transmitting electrode layer 142 may be a silver nanowire (SNW; also known as AgNW) electrode layer. In detail, the light-transmitting electrode layer 142 includes a substrate and silver nanowires doped therein. The silver nanowires overlap each other in the substrate to form a conductive network. The substrate refers to a non-nanosilver material formed by a solution including the silver nanowires through processes such as coating, heating, and drying. The silver nanowires are distributed or embedded in the substrate and partially protrude out from the substrate. The substrate can protect the silver nanowires from an external environment, such as from corrosion and abrasion. In some embodiments, the substrate is compressible.

In some embodiments, a wire length of the silver nanowires ranges from about 10 μm to about 300 μm. In some embodiments, a wire diameter (or a wire width) of the silver nanowires is less than about 500 nm. In some embodiments, an aspect ratio of the silver nanowires (a ratio of the wire length to the wire diameter) is greater than 10. In some embodiments, the silver nanowires can be deformed forms such as other conductive metal nanowires or non-conductive nanowires coated with silver. The use of the silver nanowires to form the silver nanowire electrode layers has the following advantages compared with ITO: low price, simple process, good flexibility, resistance to bending, etc.

As shown in FIG. 2, the display module 160 is attached to a side of the light-transmitting electrode layer 142 away from the pressure-sensing coating layer 141 via a bonding adhesive 150.

Figure 3:
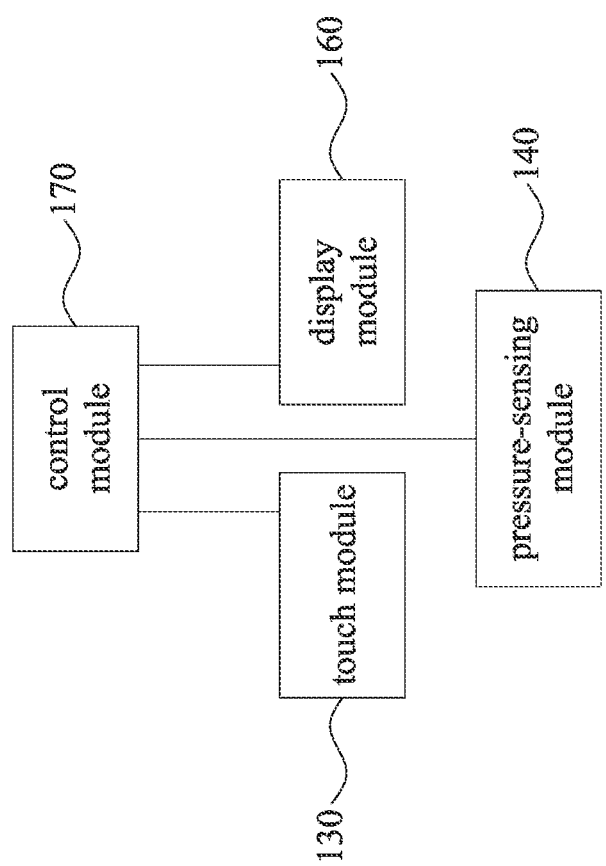
FIG. 3 is a component block diagram of some components of the electronic device shown in FIG. 1A according to an embodiment of the present disclosure.

Reference is made to FIG. 3. FIG. 3 is a component block diagram of some components of the electronic device 100 shown in FIG. 1A according to an embodiment of the present disclosure. As shown in FIG. 3, the electronic device 100 further includes a control module 170. The control module 170 is electrically connected to the touch module 130 and the display module 160, and the control module 170 is configured to detect a contact area of the touch input on the touch module 130. For example, taking a cross-sectional view of the first body 110 as an example, when the source of the touch input is a finger, the touch module 130 detects that the area where the capacitance change is generated is large, and can regard the area as the contact area of the finger. When the source of the touch input is a stylus, the touch module 130 detects that the area where the capacitance change is generated is small, and can regard the area as the contact area of the stylus. In some embodiments, after obtaining data related to the size of the contact area, the control module 170 detects the touch input via one of the touch module 130 or the pressure-sensing module 140 (that is, turning off the other of the touch module 130 or the pressure-sensing module 140).

In some embodiments, the control module 170 is further configured to: make the display module 160 display a first input interface when the contact area is greater than a first threshold area; and make the display module 160 display a second input interface when the contact area is smaller than a second threshold area, in which the second threshold area is equal to or smaller than the first threshold area.

For example, when the contact area of the touch input on the touch module 130 is greater than the first threshold area, the control module 170 can determine the source of the touch input as a finger, and make the display module 160 display the aforementioned first input interface as the virtual keyboard VK. When the contact area of the touch input on the touch module 130 is smaller than the second threshold area, the control module 170 can determine the source of the touch input as a stylus, and make the display module 160 display the aforementioned second input interface as a drawing board. In this way, the electronic device 100 of this embodiment can effectively achieve multiple integrated applications (for example, the electronic device 100 can automatically provide corresponding input interfaces in response to the touch input source being the finger or the stylus).

In some embodiments, the first threshold area ranges from about 75 mm$^2$ to about 115 mm$^2$, but the present disclosure is not limited in this regard. In some embodiments, the second threshold area ranges from about 3 mm$^2$ to about 13 mm$^2$, but the present disclosure is not limited in this regard. In some embodiments, a ratio of the first threshold area to the second threshold area is equal to or greater than 5, and may be greater than 20 in practice, but the present disclosure is not limited in this regard.

In some embodiments, the control module 170 is further configured to: detect the touch input through the touch module 130 at a first report rate when the contact area is greater than the first threshold area; and detect the touch input through the touch module 130 at a second report rate when the contact area is smaller than the second threshold area, in which the second report rate is greater than the first report rate. With this configuration, the detection accuracy of the electronic device 100 of this embodiment can be effectively improved when the contact area of the touch input is small.

In some embodiments, the first report rate ranges from about 60 Hz to about 100 Hz, but the disclosure is not limited in this regard. In some embodiments, the second report rate is equal to or greater than 200 Hz, but the disclosure is not limited in this regard.

In some embodiments, the control module 170 is further configured to: detect applied force of the touch input on the touch module 130; activate a virtual key force sensing mode (i.e., display the first input interface of the virtual keyboard VK) to detect the touch input through the pressure-sensing module 140 when the contact area is greater than the first threshold area and the applied force is greater than a first threshold force; and detect the touch input through the touch module 130 when the contact area is smaller than the second threshold area. By further determining whether the applied force is greater than the first threshold force, it can be more accurately determined whether the intention of the user's touch input is to generate a key signal through the virtual keyboard VK with a finger.

In some embodiments, the control module 170 is further configured to: not activate the virtual key force sensing mode to detect the touch input through the touch module 130 when the contact area is greater than the first threshold area and the applied force is smaller than a second threshold force. By further determining whether the applied force is smaller than the second threshold force, it can be more accurately determined whether the user's intention of touch input is only to perform a general touch operation with a finger.

In some embodiments, the first threshold force is equal to or greater than about 50 g, and the second threshold force is equal to or smaller than about 30 g, but the present disclosure is not limited in this regard.

In practical applications, the functions provided by the control module 170 can be implemented by one or more controllers.

In some embodiments, the second body 120 may include a touch module 130, a pressure-sensing module 140, and a display module 160 that are the same as those of the first body 110. In other words, the first body 110 and the second body 120 of the electronic device 100 both have the display function and the three-dimensional touch pressure sensing function. In some embodiments, the first body 110 and the second body 120 can share the control module 170, but the disclosure is not limited in this regard.

In some embodiments, the stylus used as the source of touch input may be an active stylus. That is, the active stylus itself has its own driving system to transmit a signal (that is, as a Tx transmitter) or receive a signal (that is, as a Rx receiver) when the active stylus contacts the touch module 130. Correspondingly, the control module 170 can only use one of the touch sensing electrode layers of the touch module 130 to receive a signal (that is, as an Rx receiver) or to transmit a signal (that is, as a Tx transmitter). In a two-way protocol, the Tx transmitter and Rx receiver of the active stylus and the touch module 130 can be interchanged. In addition, in some embodiments, the force sensing level of the pressure-sensing module 140 can be as high as 4096 levels, so the electronic device 100 can also use the active stylus to simulate a pen writing application.

In some embodiments, the active stylus adopts the AES 2.0 protocol, and a resistor-capacitor (RC) time constant of the active stylus is equal to or less than 600 ns. In some embodiments, the active stylus adopts the MPP 2.0 protocol, and the RC time constant of the active stylus is equal to or less than 1400 ns. In some embodiments, the active stylus adopts the USI 1.0 protocol, and the RC time constant of the active stylus is equal to or less than 1200 ns.

In some embodiments, the minimum hovering distance of the finger that can be detected by the touch module 130 is about 3 cm, but the disclosure is not limited in this regard. In some embodiments, the minimum hovering distance of the stylus that can be detected by the touch module 130 is about 2 cm, but the disclosure is not limited in this regard.

The following table shows the specifications of touch technology adopted by existing manufacturers A, B, and C.

|  | Manufacturer A | Manufacturer B | Manufacturer C |
| --- | --- | --- | --- |
| Protocol | AES 1.0 AES 2.0 | AES 1.0 | MPP 2.0 | Ownership |
| Sensor Shape | Straight | Diamond | Metal Mesh | Diamond |
| Sensor pitch (mm) | Tx: 3-5 Rx: 3-5 | Tx: 3-5 Rx: 3-5 | ≤4.2 | ≤4.2 |
| Mutual capacitance (pF) | 0.4-2.0 | 0.15-2.0 | ≤1.2 | NA |
| Report rate (Hz) | 240 | 200 | 266 | >133 |

Figure 4:
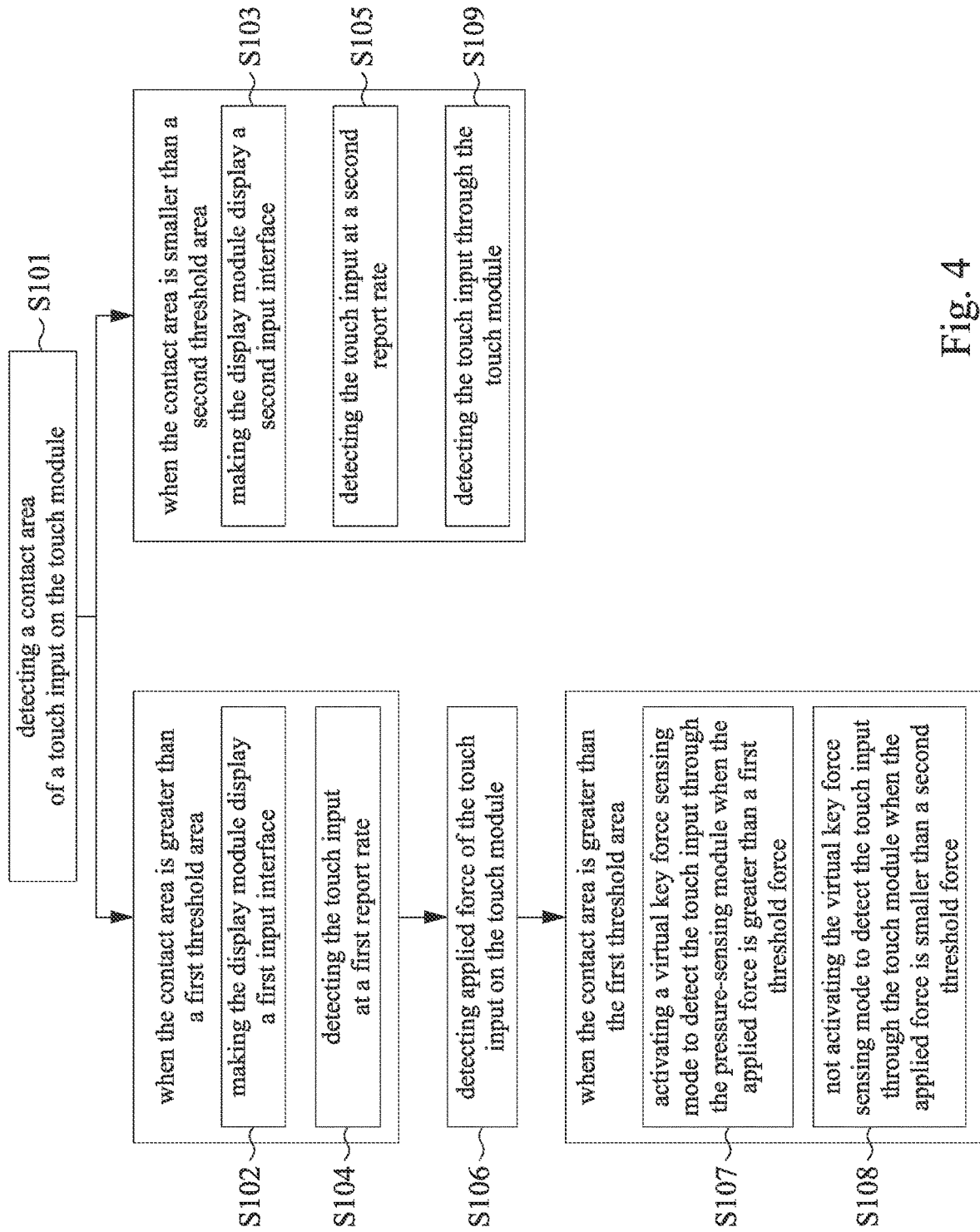
FIG. 4 is a flowchart of a touch detection method according to an embodiment of the present disclosure.

Reference is made to FIG. 4. FIG. 4 is a flowchart of a touch detection method according to an embodiment of the present disclosure. The first body 110 shown in FIG. 1A can be taken as an example, and with reference to FIG. 4, the touch detection method can be applied to an electronic device including a touch module, a display module, and a pressure sensing module disposed under the touch module. It should be noted that the flowchart in FIG. 4 can be applied to the second body 120 in addition to the first body 110. The touch detection method includes step S101 to step S109.

In step S101, a contact area of a touch input on the touch module is detected.

In step S102, the display module displays a first input interface when the contact area is greater than a first threshold area.

In step S103, the display module displays a second input interface when the contact area is smaller than a second threshold area, in which the second threshold area is equal to or smaller than the first threshold area.

In step S104, the touch input is detected through the touch module at a first report rate when the contact area is greater than the first threshold area.

In step S105, the touch input is detected through the touch module at a second report rate when the contact area is smaller than the second threshold area, in which the second report rate is greater than the first report rate.

In step S106, applied force of the touch input on the touch module is detected.

In step S107, the touch input is detected through the pressure-sensing module (i.e., a virtual key force sensing mode is activated in a finger mode, such as a force sensing keyboard input mode shown in FIG. 1B) when the contact area is greater than the first threshold area and the applied force is greater than a first threshold force. In other words, the touch module can be turned off in this step.

In step S108, the virtual key force sensing mode is not activated to detect the touch input through the touch module when the contact area is greater than the first threshold area and the applied force is smaller than a second threshold force. In other words, the pressure-sensing module can be turned off in this step.

In step S109, the touch input is detected through the touch module when the contact area is smaller than the second threshold area. In other words, the pressure-sensing module can be turned off in this step. In addition, the touch module can adopt the MPP 2.0 protocol to detect the touch input in the steps, but the disclosure is not limited in this regard.

In some embodiments, step S106 can be arbitrarily adjusted to before or after any step before step S107 and step S108.

According to the foregoing recitations of the embodiments of the disclosure, it can be seen that in the electronic device of the present disclosure, the control module is configured to make the display module display different input interfaces respectively when the contact area of the touch input relative to the touch module is greater than the first threshold area and smaller than the second threshold area, so it can effectively achieve multiple integrated applications (for example, the control module can automatically provide corresponding input interfaces in response to the source of the touch input being a finger or a stylus). In addition, the control module is configured to detect the touch input at different report rates respectively when the contact area of the touch input relative to the touch module is greater than the first threshold area and smaller than the second threshold area, so the control module can effectively improve the detection accuracy of the electronic device when the contact area of the touch input is small. Furthermore, in the finger mode, it is possible to determine whether to activate the virtual key force sensing mode or not to activate the virtual key force sensing mode according to the magnitude of the pressing force and maintain the touch mode.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device, comprising:
    a touch module configured to detect a touch input;
    a display module disposed under the touch module; and
    a control module electrically connected to the touch module and the display module and configured to:
        detect a contact area of the touch input on the touch module;
        make the display module display a first input interface when the contact area is greater than a first threshold area;
        make the display module display a second input interface when the contact area is smaller than a second threshold area, wherein the second threshold area is equal to or smaller than the first threshold area;
        detect the touch input through the touch module at a first report rate when the contact area is greater than the first threshold area; and
        detect the touch input through the touch module at a second report rate when the contact area is smaller than the second threshold area, wherein the second report rate is greater than the first report rate.

2. The electronic device of claim 1, wherein a ratio of the first threshold area to the second threshold area is equal to or greater than 20.

3. The electronic device of claim 1, wherein the first report rate ranges from about 60 Hz to about 100 Hz.

4. The electronic device of claim 1, wherein the second report rate is equal to or greater than 200 Hz.

5. The electronic device of claim 1, further comprising a pressure-sensing module disposed under the touch module and configured to detect applied force of the touch input through the touch module.

6. The electronic device of claim 1, further comprising:
    a first body, wherein the touch module and the display module are disposed in the first body; and
    a second body rotatably connected to the first body.

7. The electronic device of claim 1, wherein the touch module is a One Glass Solution (OGS) type touch module or a Glass-Film-Film (GFF) type touch module.

8. A touch detection method applied to an electronic device comprising a touch module and a display module, the method comprising:
    detecting a contact area of a touch input on the touch module;
    making the display module display a first input interface when the contact area is greater than a first threshold area;
    making the display module display a second input interface when the contact area is smaller than a second threshold area, wherein the second threshold area is equal to or smaller than the first threshold area;
    detecting the touch input through the touch module at a first report rate when the contact area is greater than the first threshold area; and
    detecting the touch input through the touch module at a second report rate when the contact area is smaller than the second threshold area, wherein the second report rate is greater than the first report rate.

9. The method of claim 8, wherein the electronic device further comprises a pressure-sensing module disposed under the touch module, and the method further comprises:
    detecting applied force of the touch input on the touch module;
    activating a virtual key force sensing mode to detect the touch input through the pressure-sensing module when the contact area is greater than the first threshold area and the applied force is greater than a first threshold force; and
    detecting the touch input through the touch module when the contact area is smaller than the second threshold area.

10. The method of claim 9, further comprising:
    not activating the virtual key force sensing mode to detect the touch input through the touch module when the contact area is greater than the first threshold area and the applied force is smaller than a second threshold force.

11. The method of claim 8, wherein the first report rate ranges from about 60 Hz to about 100 Hz.

12. The method of claim 8, wherein the second report rate is equal to or greater than 200 Hz.

13. The method of claim 8, wherein a ratio of the first threshold area to the second threshold area is equal to or greater than 20.

14. A touch detection method applied to an electronic device comprising a touch module, a pressure-sensing module disposed under the touch module, and a display module, the method comprising:
    detecting a contact area of a touch input on the touch module;
    making the display module display a first input interface when the contact area is greater than a first threshold area;
    making the display module display a second input interface when the contact area is smaller than a second threshold area, wherein the second threshold area is equal to or smaller than the first threshold area;
    detecting applied force of the touch input on the touch module;
    activating a virtual key force sensing mode to detect the touch input through the pressure-sensing module when the contact area is greater than the first threshold area and the applied force is greater than a first threshold force; and
    detecting the touch input through the touch module when the contact area is smaller than the second threshold area.

15. The method of claim 14, further comprising:
    not activating the virtual key force sensing mode to detect the touch input through the touch module when the contact area is greater than the first threshold area and the applied force is smaller than a second threshold force.

16. The method of claim 14, wherein a ratio of the first threshold area to the second threshold area is equal to or greater than 20.

* * * * *